United States Patent
Kawano et al.

(10) Patent No.: US 8,035,873 B2
(45) Date of Patent: Oct. 11, 2011

(54) HOLOGRAM RECORDING METHOD AND HOLOGRAM RECORDING DEVICE USING GENERATING LIGHT PATTERNS

(75) Inventors: Katsunori Kawano, Kanagawa (JP); Jiro Minabe, Kanagawa (JP); Koichi Haga, Kanagawa (JP); Yasuhiro Ogasawara, Kanagawa (JP); Shin Yasuda, Kanagawa (JP); Kazuhiro Hayashi, Kanagawa (JP); Hisae Yoshizawa, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 421 days.

(21) Appl. No.: 11/703,791

(22) Filed: Feb. 8, 2007

(65) Prior Publication Data
US 2008/0024848 A1    Jan. 31, 2008

(30) Foreign Application Priority Data
Jul. 28, 2006   (JP) .................................. 2006-206533

(51) Int. Cl.
*G02B 5/32* (2006.01)
*G03H 1/10* (2006.01)
*G03H 1/12* (2006.01)

(52) U.S. Cl. ............................. 359/21; 359/10; 359/11

(58) Field of Classification Search .................. 359/21, 359/10, 11
See application file for complete search history.

(56) References Cited

U.S. PATENT DOCUMENTS

| 7,324,255 B2* | 1/2008 | Tanaka et al. ............... 359/245 |
| 2006/0013104 A1* | 1/2006 | Kihara et al. ................ 369/103 |
| 2006/0077853 A1* | 4/2006 | Matsumoto et al. ......... 369/103 |

FOREIGN PATENT DOCUMENTS

| JP | A 10-302293 | 11/1998 |
| JP | A 2005-122867 | 5/2005 |

OTHER PUBLICATIONS

Substantial, The Free Merriam-Webster Dictionary, http://www.merriam-webster.com/dictionary/substantially, Jan. 21, 2011.*

* cited by examiner

*Primary Examiner* — Stephone B Allen
*Assistant Examiner* — Jade R Chwasz
(74) *Attorney, Agent, or Firm* — Oliff & Berridge, PLC

(57) ABSTRACT

A hologram recording method includes generating light of a pattern in which a plurality of unit blocks, which include at least one pixel and express luminance, are arrayed, the pattern being sectioned into a region of a signal beam and a region of a reference beam, and being generated such that the region of the reference beam includes a plurality of unit blocks whose numbers of pixels are different; collecting the generated light at a common optical system, and illuminating it onto an optical recording medium; and recording, as a hologram, data which the signal beam expresses.

14 Claims, 8 Drawing Sheets

US 8,035,873 B2

HOLOGRAM RECORDING METHOD AND HOLOGRAM RECORDING DEVICE USING GENERATING LIGHT PATTERNS

CROSS-REFERENCE TO RELATED APPLICATIONS

This application is based on and claims priority under 35 USC 119 from Japanese Patent Application No. 2006-206533 filed on Jul. 28, 2006.

BACKGROUND

1. Technical Field

The present invention relates to a hologram recording method and a hologram recording device.

2. Related Art

There have been proposed various coaxial recording methods which record a hologram by coaxially illuminating a signal beam and a reference beam onto an optical recording medium. In such recording methods, a beam, which includes a signal beam and a reference beam, is generated by a spatial light modulator, and the generated beam is collected at a common optical system and illuminated onto an optical recording medium. The signal beam and the reference beam are Fourier-transformed and overlap one another within the optical recording medium, and a hologram is recorded. In the beam which is generated by the spatial light modulator, the signal beam is disposed close to the optical axis and the reference beam is disposed at the outer side thereof.

SUMMARY

According to an aspect of the present invention, there is provided a hologram recording method including: generating light of a pattern in which a plurality of unit blocks, which include at least one pixel and express luminance, are arrayed, the pattern being sectioned into a region of a signal beam and a region of a reference beam, and being generated such that the region of the reference beam includes a plurality of unit blocks whose numbers of pixels are different; collecting the generated light at a common optical system, and illuminating it onto an optical recording medium; and recording, as a hologram, data which the signal beam expresses.

BRIEF DESCRIPTION OF THE DRAWINGS

Exemplary embodiments of the present invention will be described in detail based on the following figures, wherein.

DETAILED DESCRIPTION

Examples of exemplary embodiments of the present invention will be described in detail hereinafter with reference to the drawings.

(Coaxial Recording Method)

Figure 1:
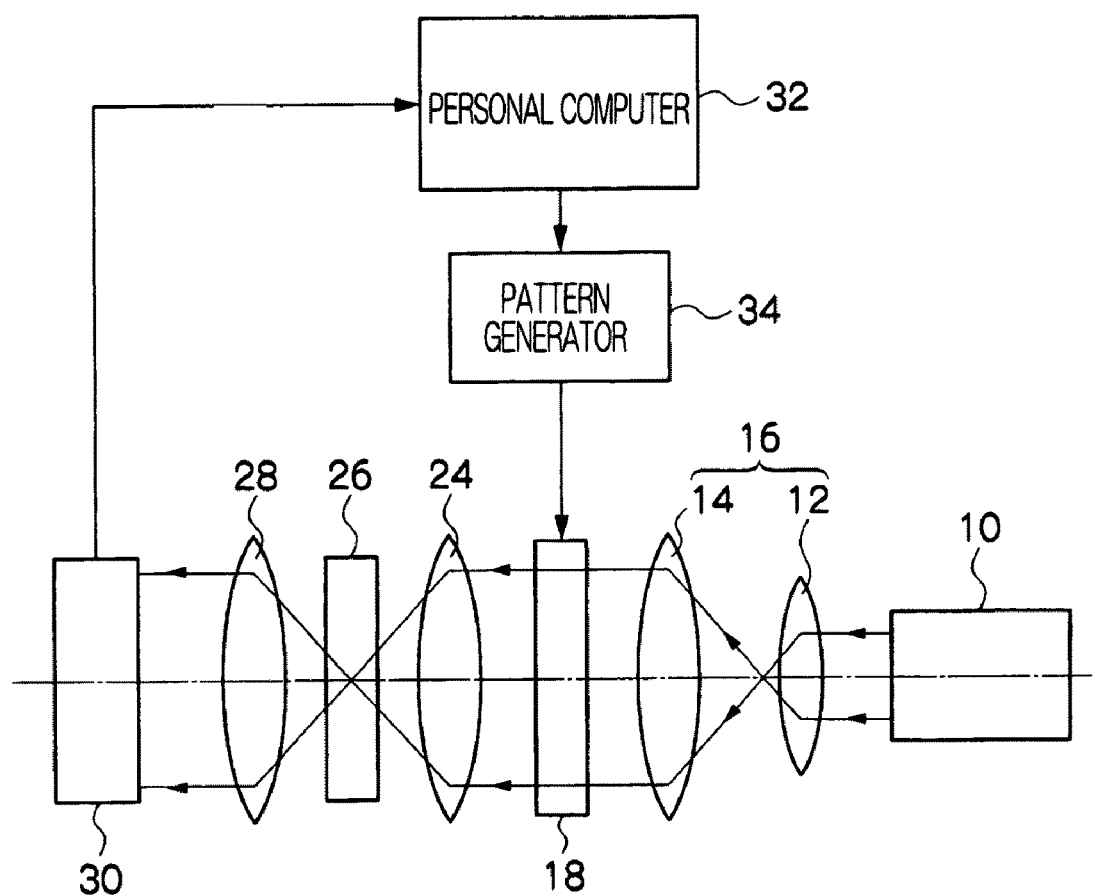
FIG. 1 is a drawing showing the structure of a hologram recording/reconstructing device used in the present exemplary embodiment.

FIG. 1 is a schematic drawing showing the structure of a hologram recording/reconstructing device used in the present exemplary embodiment. In this hologram recording/reconstructing device, a signal beam and a reference beam can be illuminated coaxially onto an optical recording medium.

A light source 10, which oscillates laser light which is coherent light, is provided at the hologram recording/reconstructing device. A beam expander 16, which is structured by lenses 12, 14, is disposed at the laser light exiting side of the light source 10. A transmission-type spatial light modulator 18 is disposed at the light transmitting side of the beam expander 16. A Fourier-transform lens 24, which illuminates a signal beam and a reference beam onto an optical recording medium 26, is disposed at the light transmitting side of the spatial light modulator 18 along the optical path in that order. Note that other lenses can be disposed between the spatial light modulator 18 and the Fourier-transform lens 24, such that the beam diameter of the beam transmitted through the spatial light modulator 18 can be adjusted.

The spatial light modulator 18 is connected to a personal computer 32 via a pattern generator 34 which will be described later. Note that, although not illustrated, the personal computer 32 has, as usual, a CPU, ROM, RAM, memory, input device, and output device. In accordance with digital data supplied from the personal computer 32, the pattern generator 34 generates a pattern to be displayed at the spatial light modulator 18. In accordance with the displayed pattern, the spatial light modulator 18 modulates the incident laser light, and generates a digital image (a signal beam) and a reference beam for each page.

When the reference beam is illuminated onto the optical recording medium 26 at the time of reconstructing the hologram, the illuminated reference beam is diffracted by the hologram, and the diffracted light is transmitted through the optical recording medium 26 and exits. A Fourier-transform lens 28, and a light detector 30, which is structured by an image pickup element such as a CCD or a CMOS array or the like and which converts the received reconstruction light (diffracted light) into electric signals and outputs the electric signals, are disposed at the diffracted light exiting side of the optical recording medium 26. The light detector 30 is connected to the personal computer 32.

Operation of the above-described hologram recording/reconstructing device will be described next.

When recording a hologram, laser light oscillated from the light source 10 is collimated into a large-diameter beam by the beam expander 16, and is illuminated onto the spatial light modulator 18. When digital data is inputted from the personal computer 32, a signal beam pattern is generated at the pattern generator 34 in accordance with the supplied digital data, and is displayed at the spatial light modulator 18 together with a reference beam pattern. At the spatial light modulator 18, the laser light is modulated in accordance with the displayed pattern, and a signal beam and a reference beam are generated.

The signal beam and the reference beam which are generated at the spatial light modulator 18 are Fourier-transformed by the lens 24, and are coaxially illuminated onto the optical recording medium 26. In this way, the signal beam and the reference beam interfere within the optical recording medium 26, and the interference pattern is recorded as a hologram. An optical recording medium structured by a material at which a hologram can be recorded, such as, for example, a photopolymer, an azopolymer, or the like, can be used as the optical recording medium 26.

When reconstructing the hologram, laser light oscillated from the light source 10 is collimated into a large-diameter beam by the beam expander 16, and is illuminated into the spatial light modulator 18. The reference beam pattern is displayed on the spatial light modulator 18. At the spatial light modulator 18, the laser light is modulated in accordance with the displayed pattern, and a reference beam is generated. The generated reference beam is illuminated, via the lens 24, onto the region of the optical recording medium 26 where the hologram is recorded. The illuminated reference beam is diffracted by the hologram, and the diffracted light exits from the optical recording medium 26.

The diffracted light which exits from the optical recording medium 26 is inverse Fourier-transformed by the lens 28, and incident on the light detector 30. In this way, a reconstructed image can be observed at the focal plane of the lens 28. This reconstructed image is detected by the light detector 30. The detected analog data is A/D converted by the light detector 30, and the image data of the reconstructed image is inputted to the personal computer 32.

(Recording Beam Pattern)

Figure 2:
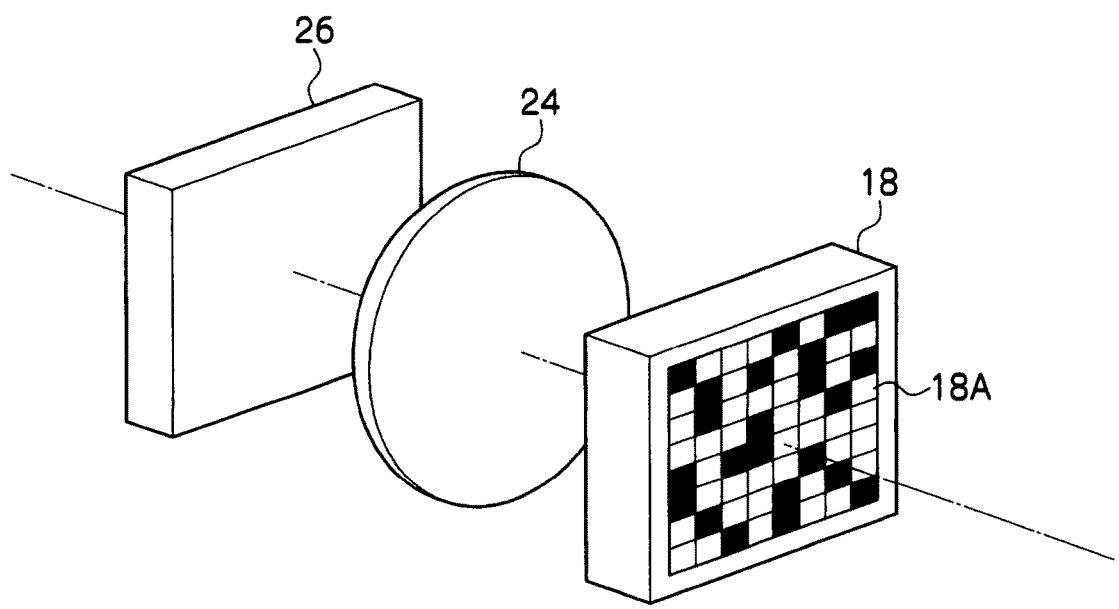
FIG. 2 is a drawing showing a state in which a recording beam is generated.

FIG. 2 shows a state in which the recording beam is generated. As described above, when a display pattern is generated at the pattern generator 34, the spatial light modulator 18 displays the generated pattern on a display region 18A thereof. The laser light is modulated in accordance with the displayed pattern, and a signal beam and a reference beam, which have luminance distributions corresponding to the displayed pattern, are generated.

Figure 3:
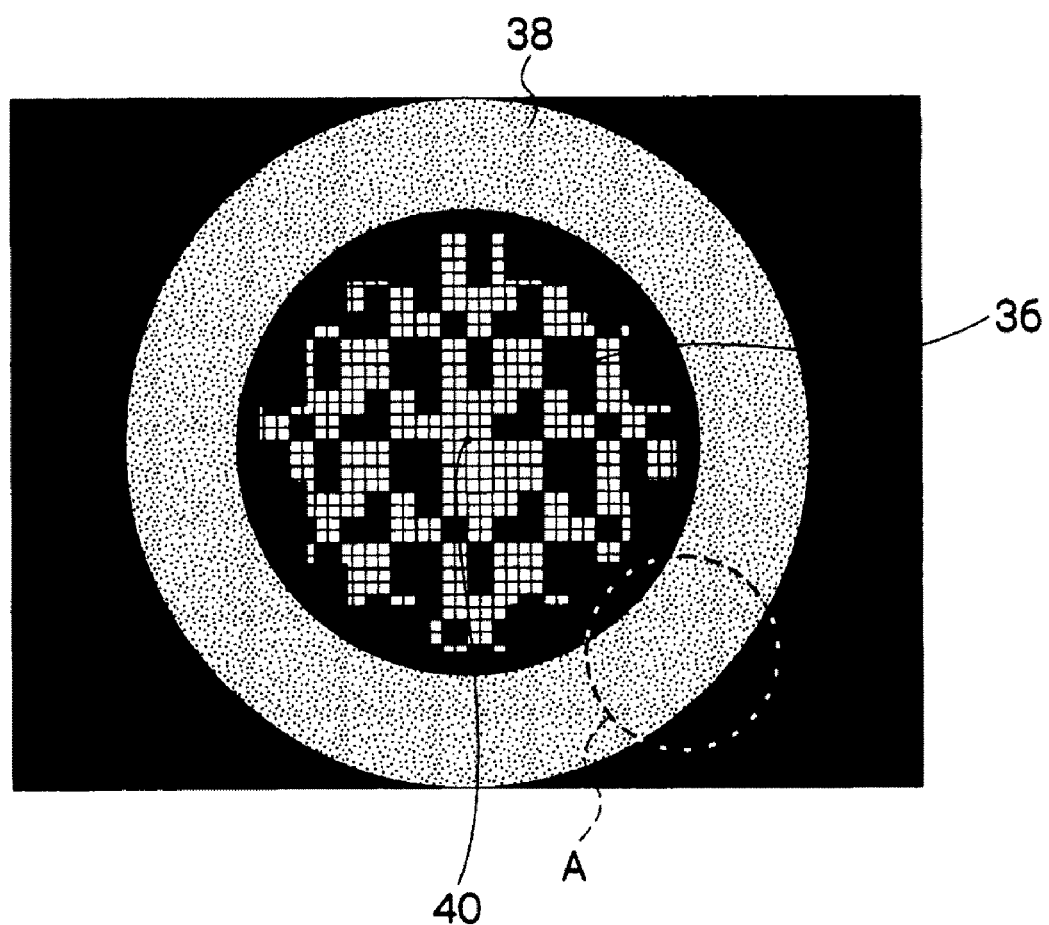
FIG. 3 is a plan view showing a recording beam pattern (luminance distribution)

FIG. 3 is a plan view showing a pattern (recording beam pattern) displayed at the spatial light modulator. By displaying this pattern, a region 36, which includes an optical axis 40 of the spatial light modulator 18, is used for data display (for the signal beam), and an annular region 38 disposed at the periphery of the region 36 is used for the reference beam. The laser light which is incident on the region 36 of the spatial light modulator 18 is modulated in accordance with the displayed pattern, and the signal beam is generated. On the other hand, the laser light which is incident on the region 38 of the spatial light modulator 18 is modulated in accordance with the displayed pattern, and the reference beam is generated.

Figure 5A:
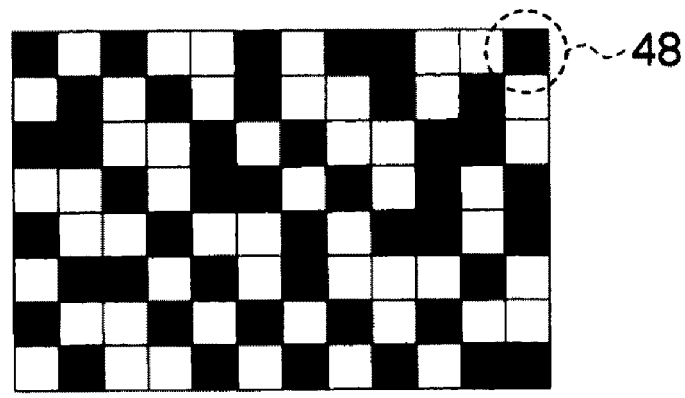
FIG. 5A is a drawing showing one of plural patterns contained in the reference beam region.
Figure 5B:
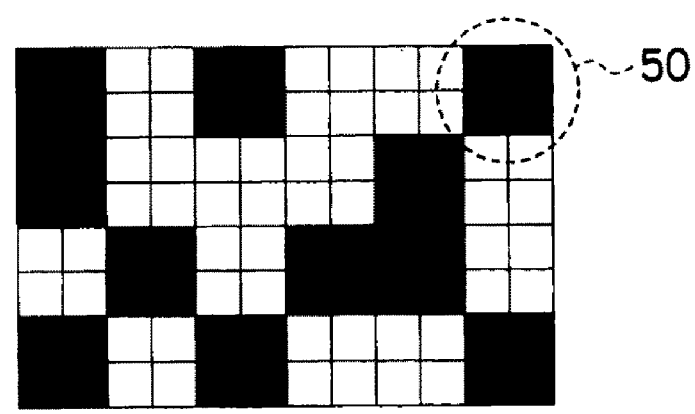
FIG. 5B is a drawing showing one of plural patterns contained in the reference beam region.
Figure 5C:
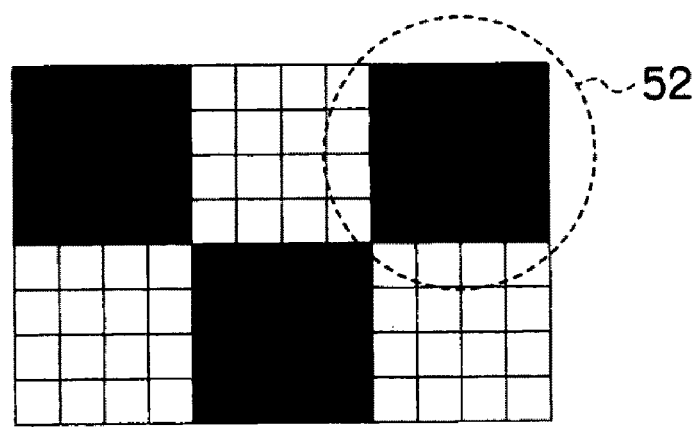
FIG. 5C is a drawing showing one of plural patterns contained in the reference beam region.

In the present exemplary embodiment, a pattern expressed by unit blocks of a predetermined size, is used as the reference beam pattern displayed at the annular region 38. The unit block here is a unit for displaying the luminance, and is displayed by a number of display pixels of the spatial light modulator 18. For example, as shown in FIG. 5A, in a case in which the unit for displaying the luminance is expressed by one display pixel, a block 48 is the unit block. Further, as shown in FIG. 5B, in a case in which the unit is expressed by four display pixels, a 2×2 block 50 is the unit block. Further, in a case in which the unit is expressed by 16 display pixels as shown in FIG. 5C, a 4×4 block 52 is the unit block.

Due to the reference beam pattern being expressed by unit blocks of plural sizes, the spreading at the time when the reference beam propagates in the optical recording medium becomes large. It is thought that this is because large blocks increase the low-frequency components of the Fourier-transform image and the propagated light approaches the optical axis side, whereas small blocks increase the high-frequency components of the Fourier-transform image and the propagated light moves away from the optical axis.

Figure 4:
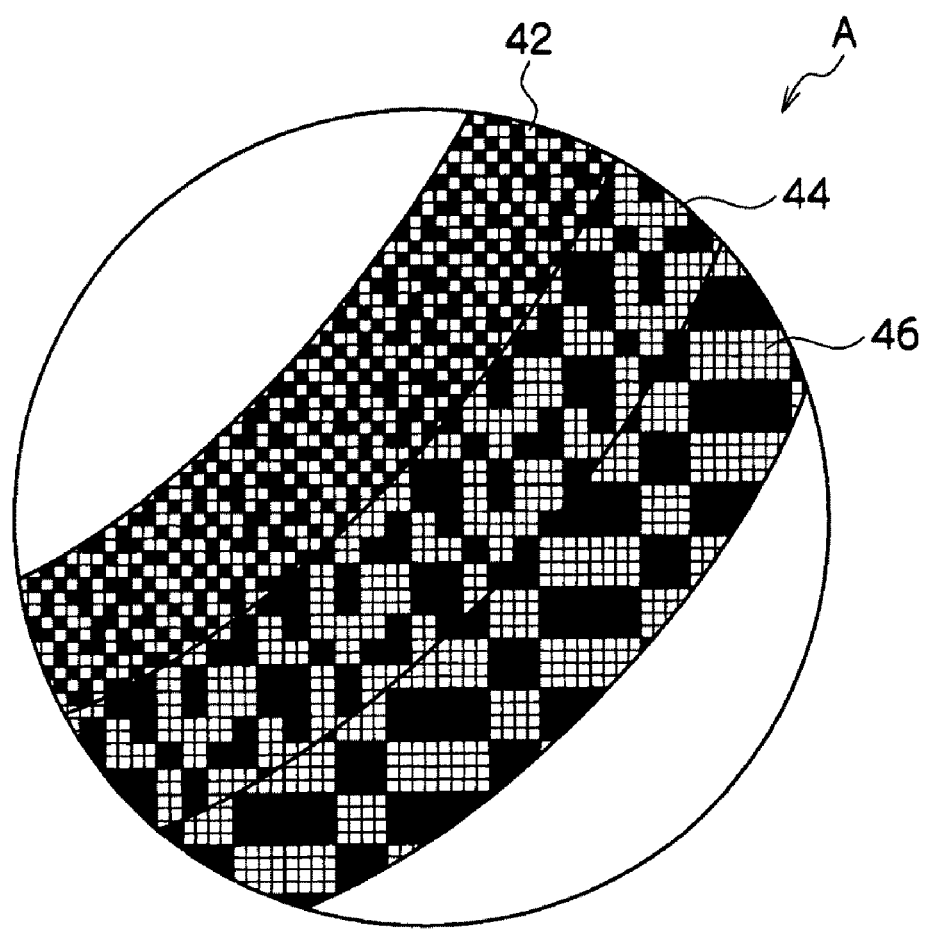
FIG. 4 is a partial enlarged view showing the structure of a reference beam region.

Next, the structure of the reference beam pattern will be described in detail. FIG. 4 is a drawing which shows, in an enlarged manner, region A of the displayed pattern shown in FIG. 3. The reference beam pattern is expressed by three types of patterns which are a first pattern 42 in which the unit blocks shown in FIG. 5A are arrayed in an annular form, a second pattern 44 in which the unit blocks shown in FIG. 5B are arrayed in an annular form, and a third pattern 46 in which the unit blocks shown in FIG. 5C are arrayed in an annular form.

The first pattern 42, the second pattern 44 and the third pattern 46 are disposed in that order from the optical axis 40 toward the outer side. Namely, the further toward the outer side from the optical axis, the more the number of pixels of the unit block increases. By increasing the number of pixels of the unit block the further toward the outer side from the optical axis, the propagated light of the outer side approaches the optical axis side, and the spreading at the time when the reference beam propagates in the optical recording medium becomes even larger.

Each of the first pattern 42, the second pattern 44, and the third pattern 46 is a random pattern in which unit blocks of different luminances are disposed randomly. Further, it is preferable that at least one of the first pattern 42, the second pattern 44, and the third pattern 46 has unit blocks which are equivalent to the unit blocks of the signal beam pattern.

As described above, in the present exemplary embodiment, the overlapping of the signal beam and the reference beam within the optical recording medium can be made to be large and the diffraction efficiency and the Bragg condition can be improved, by a simple method and without using special parts.

In particular, in a case in which coaxial recording is carried out by using a thick optical recording medium whose thickness exceeds 100 μm and an objective lens whose focal length is shorter than 20 mm, the diffraction efficiency and the Bragg condition are improved by the above-described method. When the thickness of the optical recording medium is in the range of 500 μm to 1 mm, especially marked effects can be obtained.

Note that, in the above-described exemplary embodiment, description is given of an example which uses a reference beam pattern expressed by three types of unit blocks, but there may be any number of types of unit blocks provided that the number of types is two or more. In order for there to be sufficient overlapping in the optical recording medium, it is preferable that the size of the unit block of the reference beam pattern is in a range of 0.125 times to 8 times that of the unit block of the signal beam pattern, and a range of 0.5 times to 2 times is more preferable. For example, if the unit block of the signal beam pattern is 4 pixels (2×2), a range of 1 pixel (0.5 times) to 4×4 pixels (two times) is more preferable.

Further, the above exemplary embodiment describes an example in which the signal beam pattern is disposed so as to include the optical axis, and the annular reference beam pattern is disposed at the periphery thereof. However, a signal beam pattern and a reference beam pattern, each of which are rectangular, may be disposed so as to be lined-up. In this case as well, due to the reference beam pattern being expressed by plural unit blocks, the spreading at the time when the reference beam propagates in the optical recording medium becomes large. Further, by increasing the number of pixels of the unit block the further toward the outer side from the optical axis, the spreading at the time when the reference beam propagates in the optical recording medium becomes even larger.

The above exemplary embodiment describes an example in which a transmission-type spatial light modulator is used as the generating section of the signal beam and the reference beam. However, a reflection-type spatial light modulator may be used.

(Propagated Light)

The state of the propagated light, in cases in which various patterns are displayed on the spatial light modulator using the device shown in FIG. 1, will be described hereinafter.

Figure 6A:
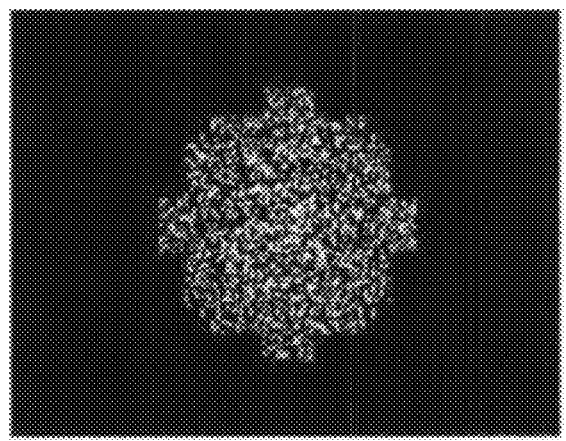
FIG. 6A is a drawing showing a state of propagation of a signal beam (in particular, a signal beam portion)
Figure 6B:
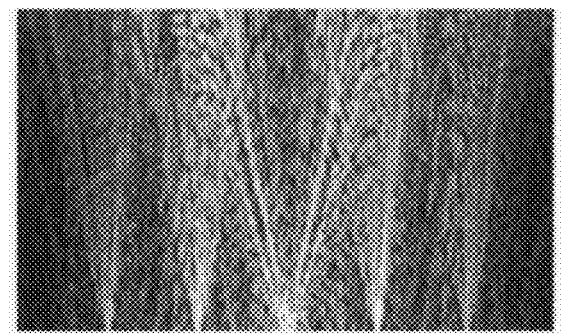
FIG. 6B is a drawing showing a state of propagation of the signal beam (in particular, propagation of the signal beam)
Figure 6C:
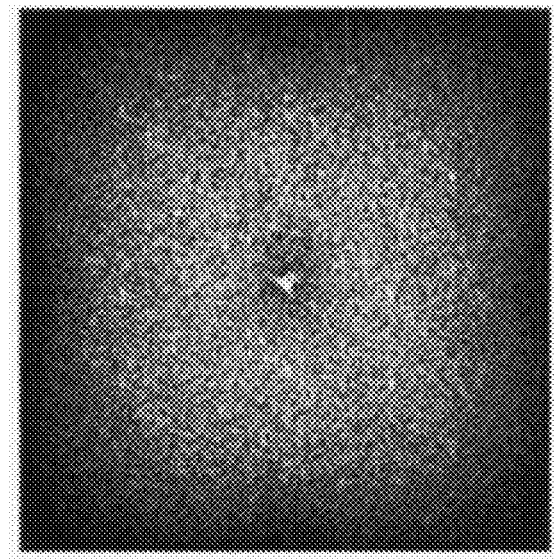
FIG. 6C is a drawing showing a state of propagation of the signal beam (in particular, Fourier-transformation of the signal beam)

FIGS. 6A through 6C are drawings showing the state of propagation of the signal beam. FIG. 6A is an example of the signal beam pattern displayed on the spatial light modulator. FIG. 6B shows the state in which this signal beam is collected within the optical recording medium by a lens. In the figure, the lower side is the Fourier-transform plane, and the state of being diffracted in accordance with the spatial frequency of the signal can be known. FIG. 6C shows the state of diffraction of the signal beam at the Fourier transform plane.

Figure 7A:
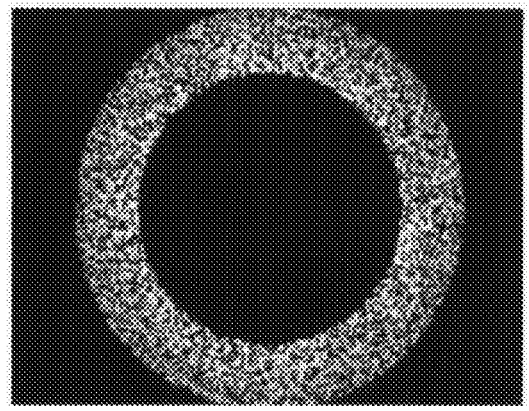
FIG. 7A is a drawing showing a state of propagation of a conventional reference beam (in particular, a reference beam portion)
Figure 7B:
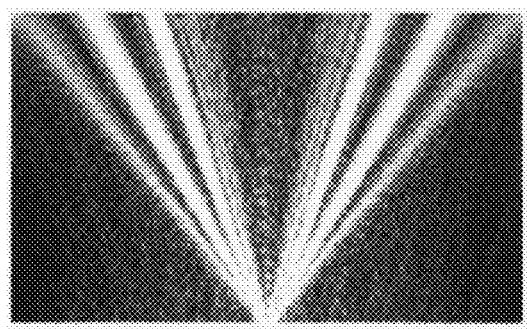
FIG. 7B is a drawing showing a state of propagation of the conventional reference beam (in particular, propagation of the reference beam)
Figure 7C:
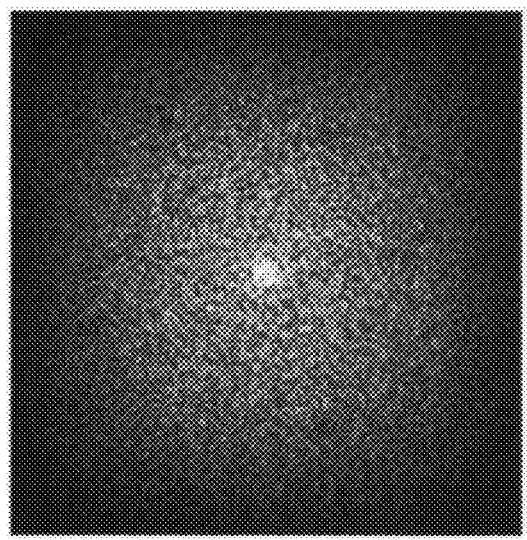
FIG. 7C is a drawing showing a state of propagation of the conventional reference beam (in particular, Fourier-transformation of the reference beam)

FIGS. 7A through 7C are drawings showing the state of propagation of a conventional reference beam. FIG. 7A is an example of the reference beam pattern displayed on the spatial light modulator. This reference beam pattern uses a ring-shaped random pattern expressed by unit blocks (2×2) of a size equivalent to that of the unit blocks (2×2) of the signal beam. FIG. 7B shows the state in which this pattern is collected within the optical recording medium by a lens. The lower side is the Fourier-transform plane, and the state of dispersion due to the diffraction in accordance with the random pattern of the reference beam can be known. FIG. 7C shows the state of diffraction of the reference beam at the Fourier transform plane.

Figure 8A:
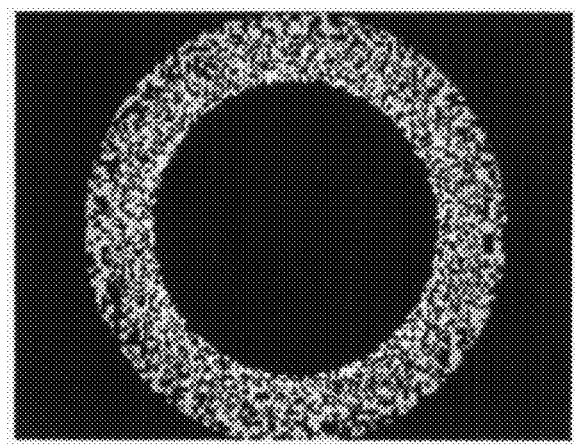
FIG. 8A is a drawing showing a state of propagation of a reference beam in the present invention (in particular, a reference beam portion)
Figure 8B:
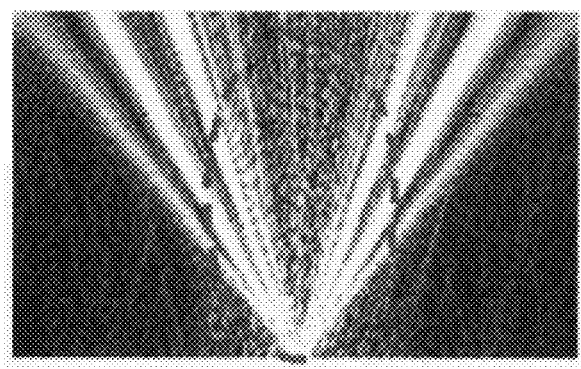
FIG. 8B is a drawing showing a state of propagation of the reference beam in the present invention (in particular, propagation of the reference beam)
Figure 8C:
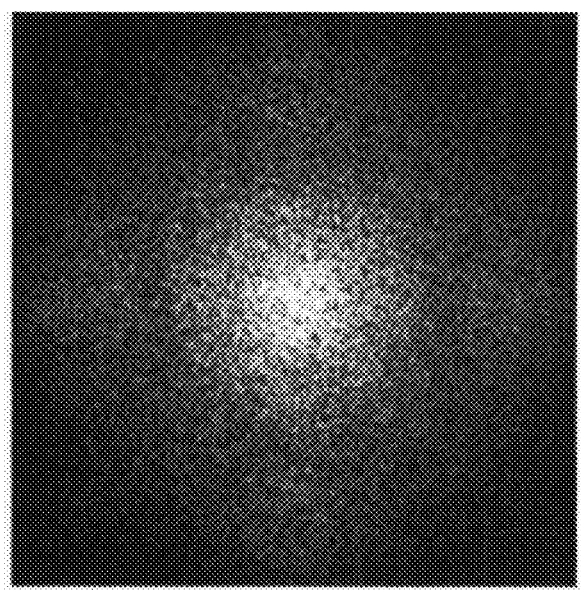
FIG. 8C is a drawing showing a state of propagation of the reference beam in the present invention (in particular, Fourier-transformation of the reference beam).

FIGS. 8A through 8C are an exemplary embodiment of the present invention, and are drawings showing the state of propagation of a reference beam in the present exemplary embodiment. FIG. 8A is an example of the reference beam pattern displayed on the spatial light modulator. This reference beam pattern is formed from three types of patterns as shown in FIG. 3 and FIG. 4. Centered around the optical axis, a ring-shaped random pattern, which is expressed by unit blocks (1×1) which are smaller than the unit blocks (2×2) of the signal beam, is disposed at the inner side, and a ring-shaped random pattern, which is expressed by unit blocks (2×2) of a size equivalent to that of the unit blocks (2×2) of the signal beam, is disposed in the middle, and a ring-shaped random pattern, which is expressed by unit blocks (4×4) which are larger than the unit blocks (2×2) of the signal beam, is disposed at the outer side. FIG. 8B shows the state in which the reference beam is collected within the optical recording medium by a lens. A state in which the propagation is different than that of the conventional reference beam can be seen. FIG. 8C shows the state of diffraction of the reference beam at the Fourier transform plane.

As can be understood by comparing FIG. 6C and FIG. 7C, in the conventional reference beam pattern, the reference beam and the signal beam overlap well at the Fourier-transform plane. On the other hand, as can be understood by comparing FIG. 6B and FIG. 7B, at the stage when the signal beam and the reference beam propagate within the optical recording medium, there is little overlapping of the signal beam and the reference beam.

In contrast, as can be understood by comparing FIG. 6B and FIG. 8B, in the reference beam pattern in the present exemplary embodiment, the propagated light increases at the portion surrounded by the dotted line where the propagated light approaches the optical axis, and, at the stage when the signal beam and the reference beam propagate within the optical recording medium, the overlapping of the signal beam and the reference beam is great as compared with the conventional reference beam. When compared with the conventional reference beam pattern, in the case of using the reference beam pattern of the present exemplary embodiment, the overlapping of the signal beam and the reference beam is improved by 10% or more over the case of using the conventional reference beam. In this way, the diffraction efficiency also improves to the same extent. Further, because the hologram recording in the depthwise direction of the optical recording medium is also enhanced, the Bragg condition as well improves by several 10%.

The present invention can include other aspects in addition to the above-described first aspect.

For example, in a second aspect of the present invention, a pattern of the region of the reference beam may be such that numbers of pixels of unit blocks disposed at an outer side, with an optical axis being the center, are greater than numbers of pixels of unit blocks disposed at an inner side.

Further, in a third aspect of the present invention, a pattern of the region of the reference beam may be a random pattern in which unit blocks of different luminances are disposed randomly.

In a fourth aspect of the present invention, in any of the first through third aspects, a pattern of the region of the reference beam may include unit blocks of numbers of pixels equivalent to numbers of pixels of unit blocks of the signal beam.

In a fifth aspect of the present invention, in any of the first through fourth aspects, the region of the reference beam may be disposed in an annular form at a periphery of the region of the signal beam.

A sixth aspect of the present invention has: an illuminating light source illuminating coherent light; a spatial light modulator structured by a plurality of pixels, which transmit or reflect the coherent light illuminated from the illuminating light source, being arrayed, the spatial light modulator modulating the coherent light, per pixel, by transmitting or reflecting the coherent light; a control section controlling the pixels of the spatial light modulator such that, in accordance with a signal for generating a signal beam and a reference beam of a pattern in which a plurality of unit blocks, which include at least one pixel and express luminance, are arrayed, a signal beam is generated by a region of a signal beam of the spatial light modulator, and a reference beam, which is of a pattern including a plurality of unit blocks whose numbers of pixels are different, is generated by a region of a reference beam of the spatial light modulator; and an optical system collecting light generated at the spatial light modulator, and illuminating it onto an optical recording medium.

In accordance with the first aspect of the present invention, there are the effects that, by a simple method, the overlapping of a signal beam and a reference beam in an optical recording medium can be made to be large, and the diffraction efficiency can be improved.

In accordance with the second aspect of the present invention, there is the effect that the overlapping of a signal beam and a reference beam in an optical recording medium becomes even greater.

In accordance with the third aspect of the present invention, there is the effect that the overlapping of a signal beam and a reference beam at a Fourier-transform, plane is large, regardless of the pattern of the signal beam.

In accordance with the fourth aspect of the present invention, there is the effect that, while the overlapping of a signal beam and a reference beam at a Fourier-transform plane can be maintained good, the overlapping becomes large also at portions of the optical recording medium other than the Fourier-transform plane.

In accordance with the fifth aspect of the present invention, there is the effect that alignment is easy.

In accordance with the sixth aspect of the present invention, there are the effects that, by a simple method, the overlapping of a signal beam and a reference beam in an optical recording medium can be made to be large, and the diffraction efficiency can be improved.

What is claimed is:

1. A hologram recording method comprising:
generating light of a pattern comprising a signal light pattern and a reference light pattern concentric to each other, the reference light pattern being disposed at an outer side of the signal light pattern, the reference light pattern including a first pattern and a second pattern, the first pattern including an array of a plurality of first unit blocks and the second pattern including an array of a plurality of second unit blocks, the signal light pattern including a substantially single pattern including an array of a plurality of unit blocks, each of the plurality of unit blocks having a same luminance;
collecting the generated light at an optical system, and illuminating it onto an optical recording medium; and
recording, as a hologram, data which the signal beam expresses,
wherein each of the first unit blocks includes a first number of pixels, each of the pixels within each first unit block having a same luminance,
each of the second unit blocks includes a second number of pixels different than the first number of pixels, each of the pixels within each second unit block having a same luminance, and
each of the pixels in the first unit blocks and the second unit blocks have substantially the same size.

2. The hologram recording method of claim 1, wherein, in a pattern of the region of a reference beam, the second unit blocks are disposed at an outer side, with an optical axis being the center, and the second number of pixels is greater than the first number of pixels of the first unit blocks disposed at an inner side.

3. The hologram recording method of claim 2, wherein a pattern of the region of the reference beam is a random pattern in which the first unit blocks and the second unit blocks of different luminances are disposed randomly within the first pattern and second pattern, respectively.

4. The hologram recording method of claim 2, wherein one of the first unit blocks or the second unit blocks has a number of pixels equivalent to a number of pixels of unit blocks of the signal beam.

5. The hologram recording method of claim 2, wherein the region of the reference beam is disposed in an annular form at a periphery of the region of the signal beam.

6. The hologram recording method of claim 1, wherein a pattern of a region of the reference beam is a random pattern in which the first unit blocks and the second unit blocks of different luminances are disposed randomly within the first pattern and second pattern, respectively.

7. The hologram recording method of claim 1, wherein one of the first unit blocks or the second unit blocks has a number of pixels equivalent to a number of pixels of unit blocks of the signal beam.

8. The hologram recording method of claim 1, wherein a region of the reference beam is disposed in an annular form at a periphery of the region of the signal beam.

9. The hologram recording method of claim 1, the reference light pattern including a third pattern, the third pattern including a plurality of third unit blocks, each of the third unit blocks having a third number of pixels different than the first and second numbers of pixels, each of the pixels within each third unit block having a same luminance.

10. The hologram recording method of claim 1, wherein the first unit blocks are disposed in a first radial band and the second unit blocks are disposed in a second radial band, the first and second radial bands having a same thickness.

11. A hologram recording device comprising:
an illuminating light source illuminating coherent light;
a spatial light modulator structured by a plurality of pixels, which transmit or reflect the coherent light illuminated from the illuminating light source, being arrayed, the spatial light modulator modulating the coherent light, per pixel, by transmitting or reflecting the coherent light;
a control section controlling the pixels of the spatial light modulator such that, in accordance with a signal for generating a signal beam and a reference beam of a pattern concentric to each other, the signal beam is generated by a region of a signal beam of the spatial light modulator, and the reference beam is generated by a region of a reference beam of the spatial light modulator, the reference light pattern being disposed at an outer side of the signal light pattern, the reference light pattern including a first pattern and a second pattern, the first pattern including an array of a plurality of first unit blocks and the second pattern including an array of a plurality of second unit blocks, the signal light pattern including a substantially single pattern including an array of a plurality of unit blocks, each of the plurality of unit blocks having a same luminance; and
an optical system collecting light generated at the spatial light modulator, and illuminating it onto an optical recording medium,
wherein each of the first unit blocks includes a first number of pixels, each of the pixels within each first unit block having a same luminance,
each of the second unit blocks includes a second number of pixels different than the first number of pixels, each of the pixels within each second unit block having a same luminance, and
each of the pixels in the first unit blocks and the second unit blocks have substantially the same size.

12. The hologram recording device of claim 11, the reference light pattern including a third pattern, the third pattern including a plurality of third unit blocks, each of the third unit blocks having a third number of pixels different than the first and second numbers of pixels, each of the pixels within each third unit block having a same luminance.

13. The hologram recording device of claim 11, wherein the first unit blocks are disposed in a first radial band and the second unit blocks are disposed in a second radial band, the first and second radial bands having a same thickness.

14. A hologram recording method comprising:
generating light of a pattern comprising a signal light pattern and a reference light pattern concentric to each other, the reference light pattern being disposed at an outer side of the signal light pattern, the reference light pattern including a first pattern and a second pattern, the first pattern including an array of a plurality of first unit blocks that each have a uniform luminance, and the second pattern including an array of a plurality of second unit blocks that each have another uniform luminance and are a different size from the first unit blocks, the signal light pattern including a substantially single pattern including an array of a plurality of unit blocks, each of the plurality of unit blocks having a same luminance;
collecting the generated light at an optical system, and illuminating it onto an optical recording medium; and
recording, as a hologram, data which the signal beam expresses,
wherein the first pattern and the second pattern are configured such that frequencies of light transmitted by the first pattern are different from frequencies of light transmitted by the second pattern, and
each of the pixels in the first unit blocks and the second unit blocks have substantially the same size.

* * * * *